US012700031B2

(12) United States Patent
Tinklepaugh et al.

(10) Patent No.: US 12,700,031 B2
(45) Date of Patent: Aug. 4, 2026

(54) SYSTEM FOR FACILITATING USER ENGAGEMENTS DURING NAVIGATION OF VIRTUAL MARKETPLACE

(71) Applicant: Truist Bank, Charlotte, NC (US)

(72) Inventors: Micah Ryan Tinklepaugh, Charlotte, NC (US); Robert Laurence Dessert, Marietta, GA (US)

(73) Assignee: TRUIST BANK, Charlotte, NC (US)

( * ) Notice: Subject to any disclaimer, the term of this patent is extended or adjusted under 35 U.S.C. 154(b) by 186 days.

(21) Appl. No.: 18/157,314

(22) Filed: Jan. 20, 2023

(65) Prior Publication Data

US 2024/0249345 A1 Jul. 25, 2024

(51) Int. Cl.
*G06Q 30/0601* (2023.01)
*G06Q 20/10* (2012.01)

(52) U.S. Cl.
CPC ......... *G06Q 30/0643* (2013.01); *G06Q 20/10* (2013.01); *G06Q 30/0611* (2013.01)

(58) Field of Classification Search
CPC ..... G06T 19/006; G06T 19/003; G06T 19/20; G06Q 40/03
See application file for complete search history.

(56) References Cited

U.S. PATENT DOCUMENTS

2009/0112744 A1* 4/2009 Park ...................... G06Q 30/00
705/34
2011/0238550 A1* 9/2011 Reich .................... G06Q 40/02
705/35

2018/0150899 A1* 5/2018 Waldron ................. G06F 3/017
2020/0081549 A1* 3/2020 Aggarwal ............. G06F 3/0304
2021/0233164 A1* 7/2021 Gaur ................... G06Q 30/0641
2022/0383397 A1* 12/2022 Haapoja ............. G06Q 30/0643
2023/0026368 A1* 1/2023 Silverstein .............. H04L 65/75

OTHER PUBLICATIONS

Shravani, Deeksha, VR Supermarket: a Virtual Reality Online Shopping Platform with a Dynamic Recommendation System, Nov. 1, 2021, 2021 IEEE International Conference on Artificial Intelligence and Virtual Reality, pp. 119-123 (Year: 2021).*

* cited by examiner

*Primary Examiner* — Victoria E. Frunzi
*Assistant Examiner* — Timothy J Kang
(74) *Attorney, Agent, or Firm* — Michael A. Springs, Esq.; Shumaker, Loop & Kendrick, LLP; Patrick B. Horne

(57) ABSTRACT

A system for engaging with a user navigating a virtual three-dimensional environment is configured to receive interaction data associated with the user interacting with an interactive element while navigating the virtual three-dimensional environment via use of a virtual reality computing device of the user, wherein the interactive element is associated with a product and/or service. The system is also configured to access personal data of the user stored to a memory device of the system. The system sends a communication to the virtual reality computing device of the user having content determined by an analysis of the received interaction data and the accessed personal data of the user.

10 Claims, 5 Drawing Sheets

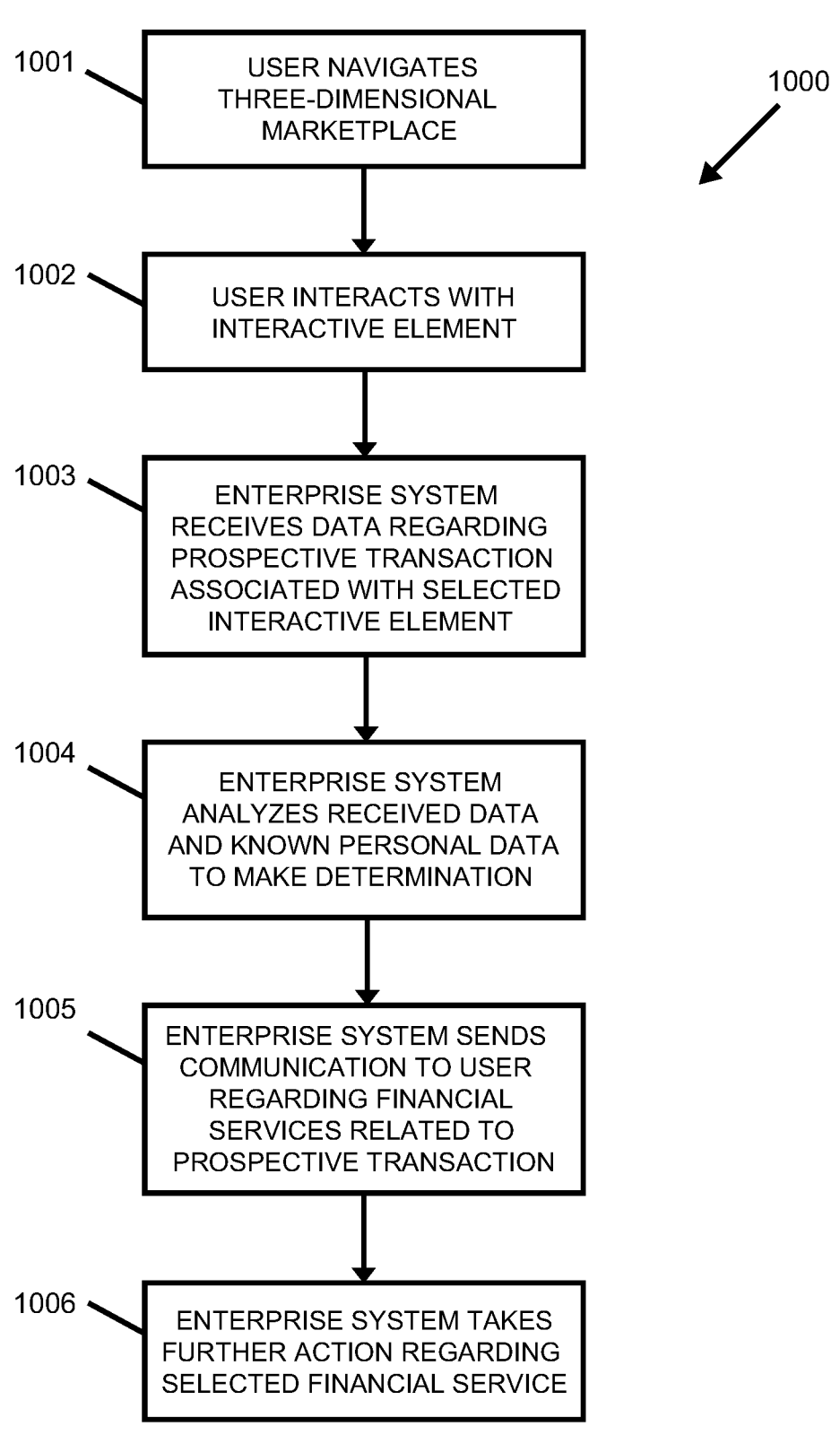

1001 — USER NAVIGATES THREE-DIMENSIONAL MARKETPLACE

1000

1002 — USER INTERACTS WITH INTERACTIVE ELEMENT

1003 — ENTERPRISE SYSTEM RECEIVES DATA REGARDING PROSPECTIVE TRANSACTION ASSOCIATED WITH SELECTED INTERACTIVE ELEMENT

1004 — ENTERPRISE SYSTEM ANALYZES RECEIVED DATA AND KNOWN PERSONAL DATA TO MAKE DETERMINATION

1005 — ENTERPRISE SYSTEM SENDS COMMUNICATION TO USER REGARDING FINANCIAL SERVICES RELATED TO PROSPECTIVE TRANSACTION

1006 — ENTERPRISE SYSTEM TAKES FURTHER ACTION REGARDING SELECTED FINANCIAL SERVICE

FIG. 5

SYSTEM FOR FACILITATING USER ENGAGEMENTS DURING NAVIGATION OF VIRTUAL MARKETPLACE

FIELD

This invention relates generally to the field of virtual reality and augmented reality, and more particularly, embodiments of the invention relate to virtual reality and augmented reality based methods of completing a transaction via interaction with a 3-D environment or other 3-D graphical representation.

BACKGROUND

It is becoming increasingly common for individual to utilize virtual reality based three-dimensional environments for performing certain social functions. Such three-dimensional environments typically allow for an avatar of the user, which may be represented within the three-dimensional environment as a three-dimensional character having a unique appearance, to navigate the three-dimensional environment for interacting with other users or certain interactive elements contained within the three-dimensional environment. The use of such a three-dimensional environment can aid in mimicking a real-world social situation while the users thereof participate remotely and from any number of different locations.

Such three-dimensional environments are increasingly offering activities for users thereof to participate in that mimic those available in real-world situations. Such activities may typically relate to forming social gatherings or competing in games against one another. One emerging use of such three-dimensional environments includes the establishment of virtual places of business, many of which mimic an existing real-world physical structure associated with the place of business being represented within the three-dimensional environment. Such virtual establishments may include the ability for navigators of the three-dimensional environment to interact with interactive elements or other user avatars for conducting business therein, wherein such interactions may be provided in a manner attempting to mimic the types of interactions that the navigator may be expected to experience when shopping in a corresponding real-world establishment.

There is accordingly a need for an efficient and effective system and method for completing transactions or establishing other contractual obligations while conducting business within a three-dimensional environment. There is also a need for such a system to integrate data regarding a participant in the transaction for further providing real-time financial services to the participant, wherein the integration of such data is facilitated by the use of the three-dimensional environment for conducting such a transaction.

BRIEF SUMMARY

Embodiments of the present invention address the above needs and/or achieve other advantages by providing apparatuses and methods that facilitate the ability to provide financial services in real-time via appropriate interventions as a user navigates a three-dimensional marketplace.

Embodiments of the invention include a system for engaging with a user navigating a virtual three-dimensional environment via a virtual reality computing device of the user. The system includes at least one processor, a communication interface communicatively coupled to the at least one processor, and a memory device storing executable code that, when executed, causes the processor to receive interaction data associated with the user interacting with an interactive element while navigating the virtual three-dimensional environment. The interactive element is associated with a product and/or service. The processor is further configured to access personal data of the user stored to the memory device and to send a communication to the virtual reality computing device of the user with the content of the communication being determined based on an analysis of the received interaction data and the accessed personal data.

According to embodiments of the invention, a method for engaging with a user navigating a virtual three-dimensional environment via a virtual reality computing device of the user includes the steps of receiving interaction data associated with the user interacting with an interactive element while navigating the virtual three-dimensional environment, wherein the interactive element is associated with a product and/or service; accessing personal data of the user; and sending a communication to the virtual reality computing device of the user, wherein a content of the communication is determined based on an analysis of the received interaction data and the accessed personal data.

According to further aspects of the invention, the interaction data may include data regarding a term of a transaction regarding the product and/or service associated with the interactive element. The term of the transaction may be a price to purchase the product and/or service associated with the interactive element. The reception of the interaction data may be indicative of the user prospectively purchasing the product and/or service associated with the interactive element. The user may have an existing account with an entity managing the system, and the accessing of the personal data of the user may include accessing data associated with the existing account. The personal data of the user may include an account balance of the existing account. The personal data of the user may include an account setting or a selection of the user.

The virtual three-dimensional environment may be a three-dimensional marketplace, and may mimic an appearance of an actual real-world marketplace. The interactive element may be a three-dimensional representation of the product and/or service or a packaging of the product and/or service. The user may view the communication during navigation of the three-dimensional environment.

The content of the communication may relate to an entity managing the system providing a financial service to the user. The content of the communication may relate to an offer for financing for completing a transaction regarding the product and/or service associated with the interactive element. The offer for financing may include an offer of a loan to the user by an entity managing the system. The content of the communication may relate to financial advice provided to the user regarding a prospective purchase of the product and/or service associated with the interactive element. The financial advice may be determined based on an analysis of the personal data of the user. The user may have an existing account with an entity managing the system, and the analysis of the personal data of the user may include analyzing data associated with the existing account. The content of the communication may relate to the system transferring funds of the user to a seller of the product and/or service associated with the interactive element.

The executable code, when executed, may further cause the processor to determine whether to send the communication to the user based on an analysis of each of the received interaction data and the accessed personal data.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
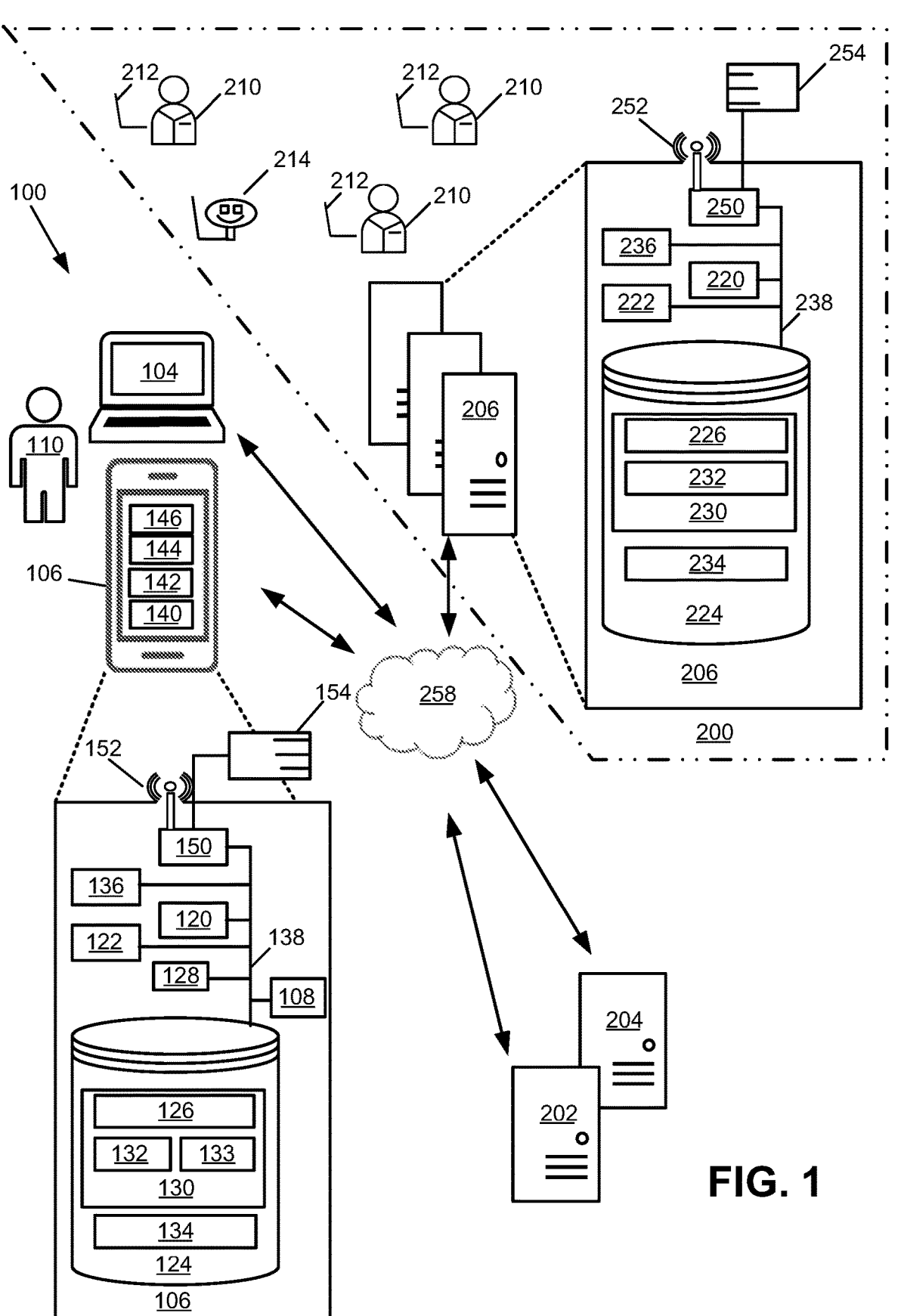

Having thus described embodiments of the invention in general terms, reference will now be made to the accompanying drawings, wherein:

FIG. 1 illustrates an enterprise system and environment thereof for engaging with a user during navigation of a virtual three-dimensional environment, in accordance with one embodiment of the present invention.

Figure 2A:
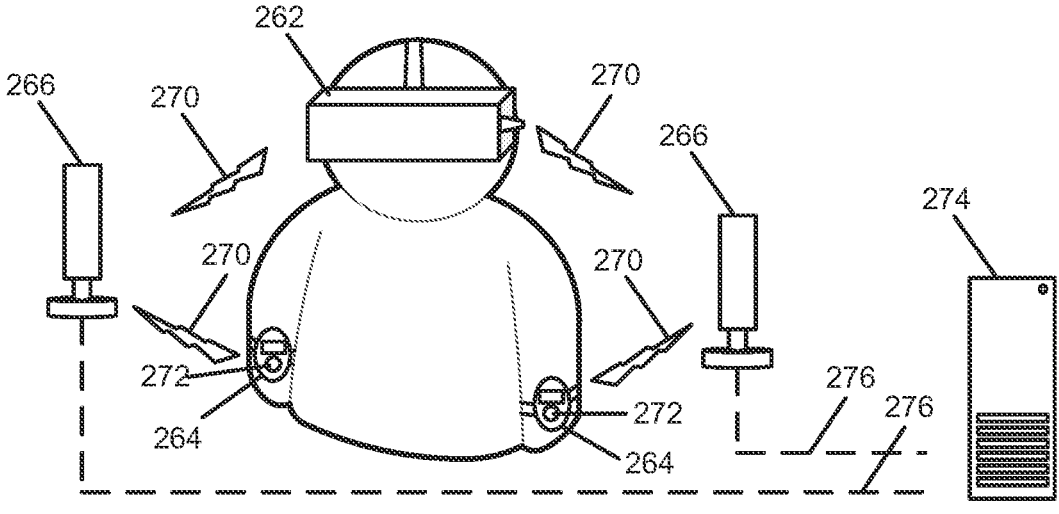

FIG. 2A illustrates equipment items, according to at least one embodiment, used in a virtual reality (VR) session.

Figure 2B:
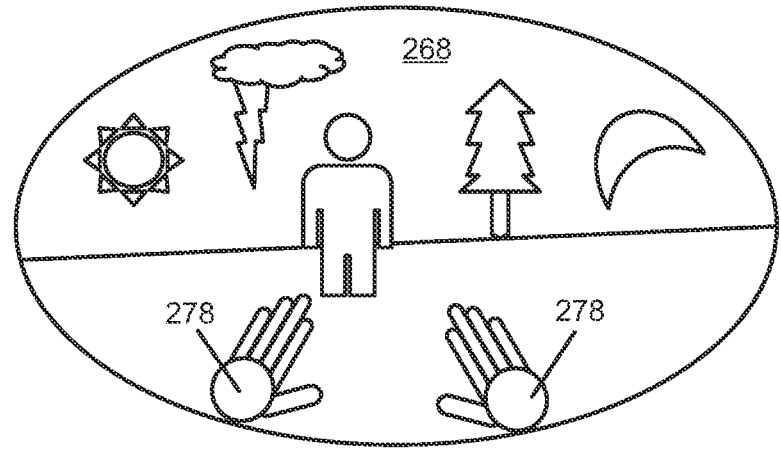

FIG. 2B shows a user view of a simulated environment in a VR session via a helmet or visor.

Figure 3A:
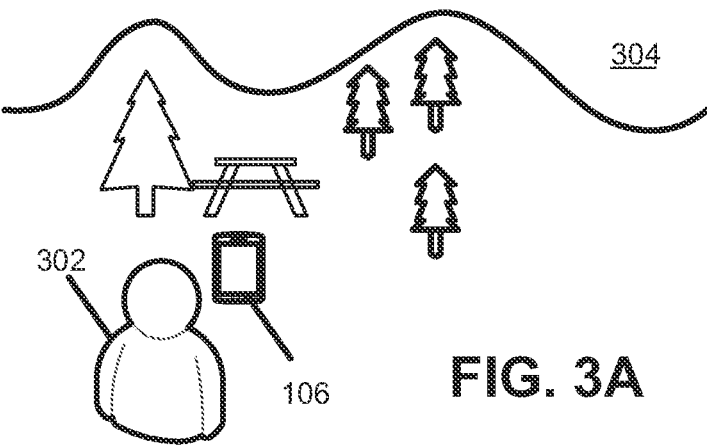

FIG. 3A illustrates an AR session in which a user views a background scene through an AR equipped mobile device.

Figure 3B:
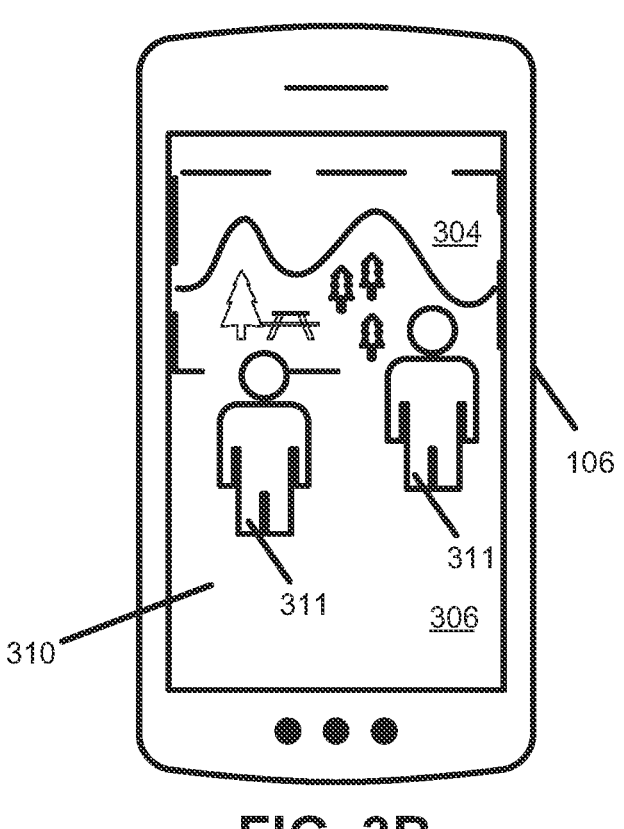

FIG. 3B shows the AR image 306 on the mobile device 106.

Figure 4:
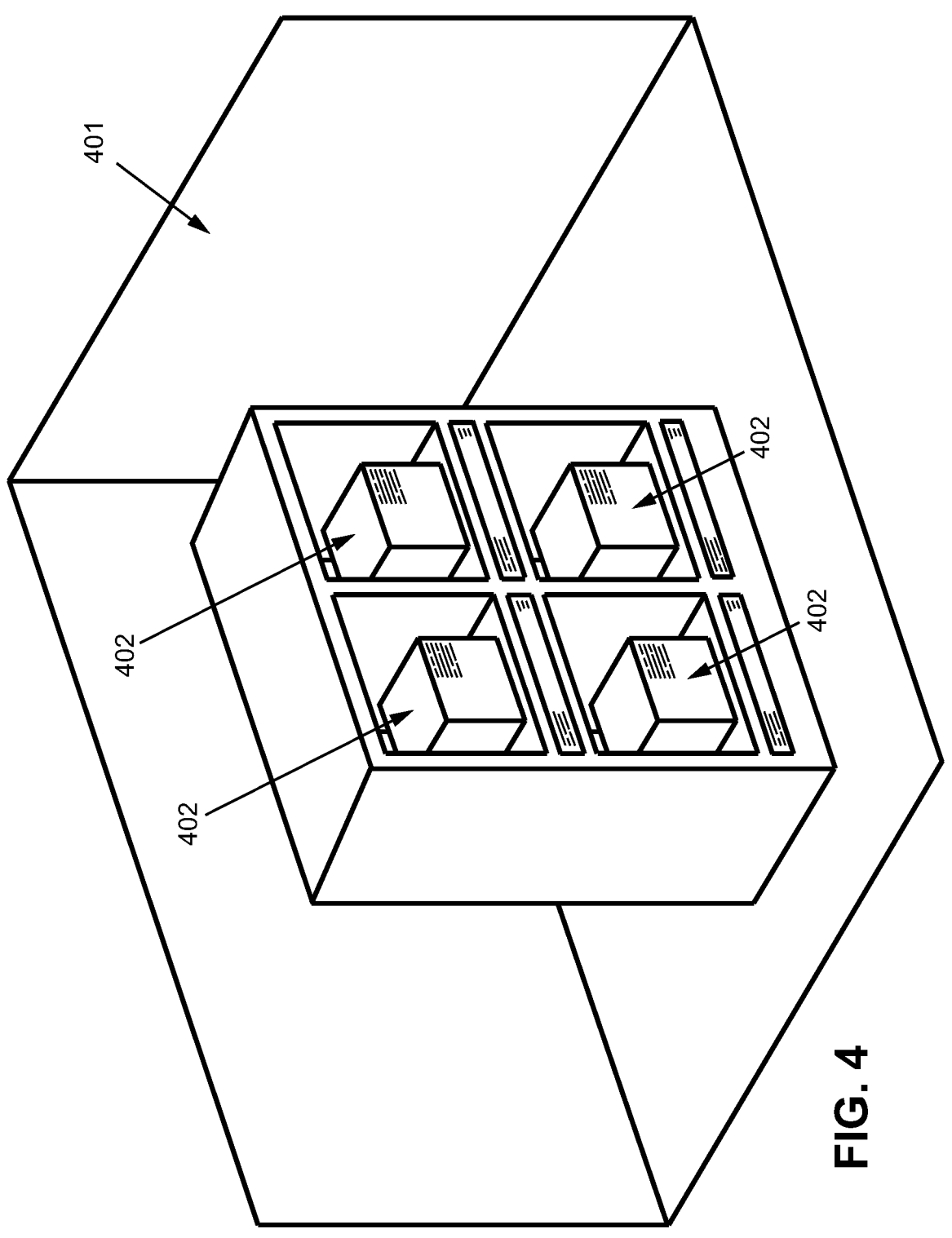

FIG. 4 illustrates an exemplary three-dimensional marketplace having interactive elements associated with the purchase of corresponding products and/or services.

FIG. 5 is a flowchart summarizing a method of engaging with the user during navigating of a virtual three-dimensional environment as shown and described herein.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the illustrated applications 132, 133 are represented as particular examples. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140

(e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed The above-described systems and computing devices, in some embodiments, are used in whole or in part to implement virtual reality (VR) and/or augmented reality (AR) functioning. Virtual reality refers to a computer-generated simulation of a three-dimensional image or environment that can be interacted with in a seemingly real or physical way by a person using special electronic equipment, such as a visor or helmet with an internal screen, and gloves, hand-held controller, and/or other effects fitted with sensors. A VR experience is typically immersive, offering the user a typically entirely artificial computer-generated environment. As vision of the real world around the user is occluded by a visor or helmet, a VR session typically occurs indoors and/or in a safe controlled environment for the safety of the user. VR equipment items are typically interactive devices represented in FIG. 2A as a visor or helmet 262, hand-held or mounted controllers 264, and sensors 266. Connections 270 in FIG. 2A represent interconnectivity among the visor or helmet 262, controllers 264, and sensors 266. The connections 270 may be wireless as represented in FIG. 2A and/or may included wired connections as well.

VR applications immerse the user in a computer-generated environment (FIG. 2B) that simulates reality through the use of the interactive elements. The helmet or visor provides the user with a stereoscopic view 268 of animated images in the simulated environment. The illusion of "being there" (telepresence) is effected by motion sensors that pick up the user's movements to enable adjustment of the view provided the user in real time. Thus, a user can tour a simulated suite of rooms, experiencing changing viewpoints and perspectives that are convincingly related to their own head turnings and steps. The hand-held or mounted controllers 264 typically include buttons and/or triggers 272 by which user actions are relayed to a computing device or system 274 to effect user control of their simulated character and/or to implement user actions with the simulated environment. The hand-held or mounted controllers 264 can be equipped with force-feedback devices that provide the sensation of touch. The hand-held or mounted controllers 264 can be ergonomically formed for comfort and secure grasp in use.

The user can, for example, pick up and manipulate objects that they see in the virtual environment. Visual confirmation of hand-held items and their manipulation can be presented to the user in the simulated environment via a simulated view of the hands, which may appear as character hands 278, such as robot, alien, athlete, soldier or other character hands. Connections 276 in FIG. 2A represent interconnectivity between the sensors and/or other interactive devices with the computing device or system 274 by which calculations and other operation are conducted to dynamically produce the changing simulated environment in which user actions such as hand movements, head movements (looking up, down, left, and right), and user-positioning within a safe environment are typically all represented in the simulated environment. The connections 276 may be wired as represented in FIG. 2A and/or may be or include wireless connections as well. The computing device or system 274 may represent any of the user computing device 104, the mobile device 106, the computing system 206 of the enterprise system 200, and/or the external systems 202 and 204 (FIG. 1). A visual VR session is illustrated in FIG. 2B. Audio information may be provided as well, for example via speakers within or mounted on the visor or helmet 262 or other nearby equipment items. A VR session can be used for gaming, viewing information, navigation, and many other uses.

Augmented reality (AR) refers to the integration of digital information with the user's environment in real time. Unlike virtual reality (VR), which creates a totally artificial environment, AR users experience a real-world environment with computer-generated perceptual information visually combined or overlaid on real world images. The computer-generated simulation of a three-dimensional image or environment can be interacted with in a seemingly real or physical way, typically using a mobile phone such as the user mobile device 106. Because an AR experience does not typically greatly occlude the user's view of their real environment, AR use is potentially more mobile and safer to use outdoors and/or in less controlled environments than VR. However, electronic equipment, such as the visor or helmet 262 (FIG. 2A) and hand-held or mounted controllers 264 may be used as well.

FIG. 3A illustrates an AR session in which a user 302 views a background scene 304 through an AR equipped mobile device 106. FIG. 3B shows the AR image 310 on the mobile device 106. A visual AR session is illustrated. Audio information may be provided as well via speakers of the device 106. The AR image 306 includes characters 310 combined with or overlaid in the background scene 304. Any number of artificial characters and/or objects can be included. An AR session can be used for gaming, viewing information, navigation, and many other uses.

The present invention relates to the user 110 of the system 100 navigating a three-dimensional environment for completing a transaction. The present invention further relates to the enterprise system 200, which is representative of a financial institution in the current example, having access to the data associated with the user 110 navigating the three-dimensional environment such that the enterprise system 200 can intervene and offer certain products or services in reaction to the interactions of the user 110 with the three-dimensional environment. The enterprise system 200 may also have access to data associated with the user 110 via the user 110 having an existing account or other existing relationship with the enterprise system 200 where such information is readily available for access to the enterprise system 200. For example, the enterprise system 200 may have access to account balances, credit scores, financial obligations, loan terms, past transactions, budgets, or the like that are indicative of a financial situation of the user 110 navigating the three-dimensional environment. The enterprise system 200 may also have access to other personal data regarding the user 110, such as certain account settings or other similar selections or preferences as made by the user 110, where such settings or selections inform the analysis of the enterprise system 200 when determining whether to take action and what content to include when such action is taken. Specific examples of such data and such interactions are expanded upon hereinafter.

The user 110 may perform the navigation of the three-dimensional environment using the system 274 as described hereinabove, wherein the system 274 may be representative of any form of the computing or mobile devices 104, 106 described herein as being capable of performing the necessary functions for performing such navigation of a three-dimensional environment. The examples hereinafter make reference to the system 274 executing at least one of the applications 132, 133 described with reference to the exemplary mobile device 106. However, it should be appreciated that the references to the applications 132, 133 herein may refer to corresponding applications executable on any of the computing devices 104 capable of supporting the navigation of such a three-dimensional environment and the execution of the processes carried out by the applications 132, 133 as described herein. For example, the system 274 may further require the necessary communication capabilities as described hereinabove for communicating data between the different systems or devices according to the examples described herein. Any such system 274 is understood to utilize any necessary components such as the described visor or helmet 262, controller 264, sensors 266, buttons or triggers 272, or the like, as necessary for the given process.

The three-dimensional environment may be referred to hereinafter as the three-dimensional marketplace by virtue of the ability of the user 110 to perform purchases of certain products (goods and/or services) while navigating the three-dimensional environment according to the representative examples disclosed hereinafter. In some embodiments, the three-dimensional marketplace may be representative of an existing physical establishment (brick-and-mortar establishment) that has been three-dimensionally modeled for navigation via the computing system 274. Specifically, the three-dimensional marketplace may include a layout of aisles or departments corresponding to those in a corresponding actual marketplace, wherein the products sold in certain aisles or departments within the actual marketplace are represented as interactive elements at corresponding aisles or departments within the three-dimensional marketplace. In other embodiments, the three-dimensional marketplace may not be based upon or otherwise related to an actual marketplace such as a specific or existing building or place of business, but may be modeled exclusively as the virtual three-dimensional marketplace for interaction via a system such as the disclosed computing system 274.

In some embodiments, the enterprise system 200 itself hosts the three-dimensional marketplace such that the user 110 accesses the three-dimensional marketplace via an application 132 managed by or otherwise associated with the enterprise system 200. That is, the application 132, which may be a mobile banking application or the like, may include a feature wherein the user 110 of the computing system 274 accesses the three-dimensional marketplace directly via use of the application 132. For example, where the enterprise system 200 is the financial institution, the application 132 may include the ability for the user to access a three-dimensional environment representative of a specific bank or other institution where the user 110 can interact with certain interactive elements or other human-controlled characters occupying the three-dimensional environment, which may be representative of agents 210 of the enterprise system 200 responsible for carrying out transactions or offering advice to the user 110.

The three-dimensional marketplace being managed by or otherwise associated with the enterprise system 200 may facilitate the ability for the enterprise system 200 to access certain data regarding the user 110 as the user 110 interacts with certain interactive elements. For example, if the user 110 wishes to purchase a certain product via navigation of the three-dimensional marketplace associated with the enterprise system 200, the application 132 generating the three-dimensional marketplace for navigation by the user 110 may have access to stored data regarding account information or the like associated with the user 110 for facilitating or advising the purchase. In other words, the application 132 generating the three-dimensional marketplace does not require external communication with an external server or database associated with a third party entity such as a one of the described external systems 202, 204, but can instead access data associated with the user 110 via the existing relationship between the user 110 and the enterprise system 200, such as the existence of an account of the user 110 with the enterprise system 200.

In other embodiments, the three-dimensional marketplace is associated with the user 110 navigating a three-dimensional environment that is generated, monitored, or otherwise administered by one of the external systems 202, 204 other than the enterprise system 200 itself. For example, the user 110 may access the three-dimensional marketplace via another application 133 executable on the system 274 that is associated with the marketplace itself, or with the three-dimensional environment hosting the marketplace. The application 133 associated with the marketplace and/or three-dimensional environment may offer a feature where the user 110 can access the three-dimensional marketplace via use of the application 133. The user 110 is then able to shop or otherwise interact with elements included within the three-dimensional marketplace via use of the application 133. As used hereinafter, all references to the application 132 refer to an application managed by the enterprise system 200, whereas all references to the application 133 refer to an application managed by a third-party entity such as is associated with one of the external systems 202, 204 in communication with the enterprise system 200 and the user 110 via the system 274.

Another variation may exist wherein two or more distinct entities are associated with the user 110 navigating the three-dimensional marketplace and carrying out the methods disclosed herein. One such circumstance may include a first entity 202 generating a three-dimensional environment or integrated system of environments that may be accessed by the user 110 via a corresponding application 133 executable via the system 274. The three-dimensional environment(s) may include distinct locations, models, or the like associated with certain third-party second entities 204. The first entity 202 may accordingly act as a host environment for the third-party second entity 204 to conduct business within the first entity generated three-dimensional environment(s).

Such circumstances where an application 133 associated with a third-party external entity 202, 204 is required for gaining access to the desired three-dimensional environment may accordingly require there to be communication between the third-party external entity 202, 204 and the enterprise system 200 in order for the enterprise system 200 to access the data regarding the user 110 as described herein. In some embodiments, the enterprise system 200 and the third-party external system 202, 204 may have an express agreement or the like wherein the external system 202, 204 can query the enterprise system 200 for the necessary data according to certain permissions or credentials supplied by the user 110 for allowing such communications, or vice versa.

In other circumstances, the enterprise system 200 may itself be associated with an application 132 that is configured to be executable contemporaneously to the application 133 associated with generating or maintaining the three-dimensional marketplace. That is, the system 274 may execute at least two different applications that may be associated with at least two different entities, such as the enterprise system 200 and at least one of the external systems 202, 204, for providing the necessary communication for carrying out the methods described hereinafter.

The system 274 and the applications executed thereon may be configured wherein the data associated with the navigation of the three-dimensional marketplace via the application 133 is able to be monitored and reacted to by the application 132 associated with the enterprise system 200 to allow for real-time interventions and interactions between the user 110 and the enterprise system 200. The application 132 associated with the enterprise system 200 may monitor the data transferred to and from the system 274 utilized by the user 110 during navigation of the three-dimensional environment to allow for the enterprise system 200 to intervene at an appropriate instance. For example, the application 132 associated with the enterprise system 200 may be configured to monitor certain data received by the system 274 during navigation of the three-dimensional environment. The application 132 may monitor for data that corresponds to the user 110 prospectively completing a transaction via navigation of the three-dimensional environment, such as completing a purchase of a product. Such data may be data associated with a price of the product or other information about the product about to be purchased, and such data may be communicated upon the user 110 interacting with a certain interactive element displayed within the three-dimensional marketplace. Upon determining that such data has been received or accessed by the user 110, the application 132 associated with the enterprise system 200 may be configured to access certain data associated with the user 110 for carrying out the processes and methods disclosed herein, such as by communicating externally with a database associated with the enterprise system 200, such as the storage device 224.

In further circumstances, the enterprise system 200 and the external system 202, 204 hosting the three-dimensional marketplace may be configured to query each other in response to certain actions taken by the user 110. Such queries may be associated with an express agreement between the enterprise system 200 and the external system 202, 204 regarding a procedure for handling a transaction carried out via the three-dimensional marketplace. Such an agreement may include the application 133 associated with the generating of the three-dimensional marketplace being preprogrammed to communicate with the enterprise system 200, or to redirect the user 110 to the application 132 associated with the enterprise system 200, whenever the user 110 has triggered such an event via an action taken by the user 110 during navigation of the three-dimensional marketplace. For example, when a purchase is about to occur following navigation of a three-dimensional marketplace, the application 133 generating the three-dimensional marketplace may be triggered to cause the corresponding external system 202, 204 to communicate with the enterprise system 200 regarding financial data or data associated with completing a transaction on behalf of the user 110.

Regardless of the configuration of the system 100 utilized in carrying out the present invention, the enterprise system 200 is responsible for engaging with the user 110 when the user 110 navigates the three-dimensional marketplace and interacts with an interactive element corresponding to the purchase of a product. Referring now to FIG. 4, an exemplary three-dimensional marketplace 401 is shown. The three-dimensional marketplace 401 includes a plurality of interactive elements 402 disposed therein, wherein each of the interactive elements 402 is representative of a product for sale within the marketplace 401. In the provided example, the interactive elements 402 are arranged spatially to mimic a corresponding shelving arrangement as may be found in a corresponding brick-and-mortar establishment, thereby closely mimicking an actual shopping experience. However, the interactive elements 402 corresponding to the products may have any arrangement or configuration within the three-dimensional marketplace 401 while remaining within the scope of the present invention, including utilizing an arrangement that is not achievable in a real-world three-dimensional environment. As shown in FIG. 4, each of the interactive elements 402 may be associated with a three-dimensional representation of the product or the packaging thereof and/or may be associated with a label or other informational element disposed adjacent thereto, as the circumstances may warrant. The user 110 may interact with the interactive element 402 via interaction directly with the three-dimensional representation of the product itself and/or via interaction with a label, price tag, or other informational element associated with the product, as is necessary to facilitate the purchase of the product.

Specifically, an interaction with the interactive element 402 in the manner described herein refers to an interaction facilitating a purchase of the product corresponding to the interactive element 402. The specific form of interaction occurring may be determined by the manner in which the user 110 navigates the three-dimensional marketplace 401 and interacts with the elements therein according to the established rules of the three-dimensional marketplace 401. For example, an interaction may include one or more of the avatar of the user 110 being in proximity to the interactive element 402 within the three-dimensional marketplace 401, the user 110 placing the interactive element 402 within a viewing perspective of the user 110, or the avatar of the user 110 selecting or manipulating the interactive element 402 in some manner as facilitated by a feature of the system 274 associated with one of the components 262, 264, 266, 272 thereof. Any such interaction facilitated by the user 110 with the intention of making a prospective purchase may be considered to be within the scope of the present invention.

The navigation of the three-dimensional marketplace 401 via the user 110 requires a transfer of data between the entity hosting the three-dimensional marketplace 401 and the system 274 operated by the user 110. This transfer of data results in the ability of the system 274 to monitor the data that is transferred that corresponds to the user 110 interacting with a specific interactive element 402 corresponding to the completion of a transaction. Specifically, as described above, the application 132 may be hosting the three-dimensional marketplace 401 itself, and hence the data corresponding to the navigation of the three-dimensional marketplace 401 by the user 110 may be known directly by the enterprise system 200 via its management of the application 132. In another example, the third party application 133 associated with one of the external entities 202, 204 hosts the three-dimensional marketplace 401, and the application 132 is executed simultaneously to monitor the data exchanged between the system 274 and the corresponding external entity 202, 204. This ability to monitor such data transfer provides an ability for the enterprise system 200 to intervene accordingly whenever it is determined that a specific type of interaction is occurring within the three-dimensional marketplace 401, such as those interactions related to the acquiring of information regarding a product, or those interactions relating to the eventual purchase of said product.

In some circumstances, the external entity 202, 204 hosting the three-dimensional marketplace 401 and the enterprise system 200 may have an agreement wherein certain data is automatically routed to the enterprise system 200 in reaction to a certain interaction taking place within the three-dimensional marketplace 401, thereby facilitating the transfer of the data necessary for the enterprise system 200 to determine that an intervention is to occur. In other circumstances, the enterprise system 200, via the application 132, may monitor the data transferred between the system 274 and the external entity 202, 204 to cause the enterprise system 200 to only intervene when a determination is made that a specific type or form of interaction is taking place that corresponds to the intervention of the enterprise system 200.

As noted above, the method of interaction between the user 110 and a corresponding interactive element 402 may be determined by the organization of the three-dimensional marketplace 401, hence no specific or limiting method of performing such an interaction is required to remain within the scope of the present invention. The corresponding interaction may generally lead to the user 110 being presented an interface for completing the purchase according to certain terms and conditions, such as may be typical of an online shopping experience. However, any process leading to the ability of the user 110 to eventually purchase the product in question may be utilized by the three-dimensional marketplace 401 for completing the transaction, including redirecting the user 110 to another three-dimensional environment, or providing an agent of the three-dimensional marketplace 401 for facilitating the transaction. In any event, an interaction corresponding to a prospective purchase may refer to any interaction forming at least one step of a process of completing such a transaction, thereby allowing for the ability to monitor the transferred data for such interactions that may eventually lead to a transaction.

The described interaction is also not limited to the purchase of a single product corresponding to a single interactive element 402. The three-dimensional marketplace 401 may include a feature wherein the user 110 chooses multiple different products for placement within a "virtual shopping cart" as is known in online shopping applications, wherein a single transaction can be utilized to collectively purchase the multiple products. The present invention may include the intervention of the enterprise system 200 in reaction to an interaction by the user 110 corresponding to the user 110 attempting to purchase the entirety of the contents of the virtual shopping cart. The present invention may accordingly apply to singular or collective purchases, and may include the monitoring of data relating to each individual product and/or all of the products collectively. For example, the enterprise system 200 may utilize data corresponding to the individual purchase of each product, such as when determining when any one individual product purchase indicates the need for an intervention, or may utilize data corresponding to the collective purchase of all items, such as when determining when the collective price results in the need for a different financial service than would the price of an individual product. Any such interactions leading to the purchase of one or all such products may be considered to be such an interaction with one of the interactive elements 401 as described herein.

The determination by the enterprise system 200 that a transaction may take place causes the enterprise system 200 to determine whether to intervene via a communication to the user 110 providing certain financial services related to or otherwise associated with the completing of the transaction, either directly or indirectly. Such financial services may include offering financial advice regarding the prospective transaction, offering educational information regarding the prospective transaction, offering financing for completing the transaction, or directly facilitating a transfer of funds between the necessary parties via a transfer to or from an account of the user 110 as established with the enterprise system 200. Examples of such interventions are expanded upon hereinafter.

The financial services offered to the user 110 in response to the enterprise system 200 receiving the data regarding a prospective purchase may be determined based on an analysis of the personal data set of the user 110 as known to the enterprise system 200 due to the existing relationship therebetween. Among a selected financial service, the terms of a corresponding agreement may also be determined based on such an analysis. For example, an analysis of the personal data set of the user 110 may determine that the user 110 is eligible for a loan for the prospective purchase based on the user 110 meeting certain credit requirements as determined by the analysis of the personal data set of the user 110, and may further offer specific terms of such a loan on the basis of the personal data set of the user 110. As another example, the enterprise system 200 may be configured to provide educational services or advice to the user 110 when certain determinations are made, such as informing the user 110 that the prospective purchase falls outside of a budget of the user 110, or will have some other form of negative or high-risk consequence for the user 110.

In some embodiments, the enterprise system 200 may access the personal data of the user 110 to determine if the generation of a communication or other intervention for informing the user 110 of a potential financial service offered by the enterprise system 200 is necessary. For example, the enterprise system 200 may reference a known credit rating or credit history of the user 110, as stored to the storage device 224 and known due to the relationship existing between the user 110 and the enterprise system 200, for determining if a loan is appropriate with reference to the goods and/or services that the user 110 is seeking to purchase. As another example, the enterprise system 200 may only offer a loan when a certain set of conditions are determined to be met, such as determining that the account balance(s) of the user 110 have insufficient funds to support the purchase of the desired goods and/or services absent such a loan. Alternatively, the enterprise system 200 may avoid such offers when it is clear that the financial situation of the user 110 does not require such a loan, such as when an account balance far exceeds the cost of a prospective purchase. In summary, the enterprise system 200 may be configured to determine whether to send a communication to the user 110 regarding a prospective transaction when at least one data entry associated with a personal data set of the user 110 meets at least one condition corresponding to the generation of a communication. The condition may include a numeric value of the corresponding data entry being equal to, below, or above a specified number, such as described in the preceding examples. A set of conditions may be required to be met, or certain data entries may be utilized in an algorithm for making such a determination.

The computing system 206 of the enterprise system 200 performs any necessary analysis as contemplated above and then determines whether to send a communication to the user 110 regarding an offer of one of the described financial services. When it is determined that a communication be sent, said communication may include the user 110 being made aware of the information contained within the communication using any corresponding method associated with the navigation of the three-dimensional marketplace 401. That is, as discussed above, the organization of the three-dimensional marketplace 401 may determine the method of communication that occurs between the enterprise system 200 and the user 110, so long as the user 110 is able to interact with the enterprise system 200 for carrying out the processes as described herein.

As one example, the communication may include whichever application 132, 133 is hosting the three-dimensional marketplace 401 showing a pop-up window or similar prompt that overlays the view of the user 110 of the three-dimensional environment 401, or the like. As another example, a three-dimensional object or avatar may be generated within the three-dimensional marketplace 401 for further interaction with the user 110. As another example, the user 110 may be redirected to another interface, such as a video streaming interface, for conducting a discussion with an agent 210 of the enterprise system 200. The user 110 is made aware of the existence of the communication while navigating the three-dimensional marketplace and prior to the completion of the associated transaction. The above examples may include the user 110 directly interacting with the application 132 while the application 133 runs concurrently, or may include the integration of the described features into the application 133 via an agreement between the enterprise system 200 and the corresponding external entity 202, 204. In any event, the communication 200 originates from the enterprise system 200 and is sent to the user 110 for perception via the system 274, whether communicated via the application 132 directly or indirectly via a function of the application 133.

The receipt of the communication by the user 110 results in the ability of the user 110 to further engage with the enterprise system 200, depending on the type of communication and the financial related contents thereof. Examples of such engagement are elaborated hereinafter with respect to each of the general examples provided above.

Accordingly to one example, the communication includes financial advice regarding the prospective purchase. The financial advice may include advice regarding a recommendation on whether the purchase is within the budget of the user 110, whether the purchase can be afforded according to a balance of one or more accounts of the user 110 with the enterprise system 200, which form of payment to utilize for maximizing the rewards or points associated with making the transaction (such as is common to certain credit cards), whether a loan may be required or advisable to complete the transaction, budgeting tips for covering the expense associated with the prospective purchase, or the like.

According to another example, the communication includes educational information having some relationship to the transaction that is prospectively about to occur. In some circumstances, such educational information may include information that is associated with the specific good or service being purchased, such as common considerations to take in account when purchasing specific products. In other circumstances, such educational material may relate to completing the process via the intervention of the enterprise system 200, such as providing educational information regarding the loan application process that is utilized when the user 110 requests financing for completing the transaction in question (as explained in the following example).

According to another example, the communication includes a request for the user 110 to participate in financing for collecting the funds required for completing the transaction in question. As one example, the enterprise system 200 offers a loan of a specified monetary amount for facilitating the completion of the transaction, wherein the loan amount may cover the entire cost of the transaction or an amount allowing for completion of the transaction when considered in addition to further funds of the user 110. As mentioned above, the communication may include specific terms including an interest rate, term length, etc. As another example, the communication may relate to an offer for the establishment of a new line of credit for the user 110, such as may be associated with the enterprise system 200 issuing a credit card or the like to the user 110.

The receipt of the communication relating to the financing options by the user 110 may lead to any of a variety of different processes occurring for completing an agreement associated with such financing. In some circumstances, the enterprise system 200 may have access to all necessary information for making an offer to the user 110 according to one of the above examples, and may accordingly populate all associated fields of any such financing agreement automatically. In other circumstances, the enterprise system 200, via the application 132 or an associated function of the application 133, may query the user 110 for additional information associated with populating any remaining fields of the financing agreement according to selections or entries by the user 110. In other circumstances, the enterprise system 200, via one of the applications 132, 133, may redirect the user 110 to discuss the financing agreement with an agent 210 of the enterprise system 200, or to facilitate the populating of any remaining fields of the agreement via the agent 210. Such an interaction may include the user 110 and the agent 210 communicating via text communication, via one or two way video streaming, or via corresponding avatars navigating the three-dimensional marketplace, or another three-dimensional environment into which the user 110 may be redirected when communicating with the agent 210.

The enterprise system 200 is not limited to offering financing that originates directly from the enterprise system 200. In some embodiments, the communication from the enterprise system 200 may include information relating to financing offers originating from one or more third-party entities, such as providing a list of loan offers from participating financial institutions. The enterprise system 200 may accordingly facilitate the ability for the user 110 to choose the financing agreement that is best suited to the needs of the user 110 by reference to multiple competing offers.

Each of the loans described herein may be determined via processes that are traditionally referred to as real-time decision making processes or loan automation processes. Such processes include the eligibility of the corresponding user 110 for the loan and/or the terms of the corresponding loan being determined automatically by a decision engine operating according to algorithms established by the entity offering the financing. As explained above, the relationship present between the user 110 and the enterprise system 200 allows for any necessary communications to be carried out between the relevant entities to collect all relevant data regarding the user 110 for making such determinations according to the described decision engine, including the use of any personal information regarding the user 110 that is available to the enterprise system 200, including data that is exclusive to the enterprise system 200. The real-time decision making as carried out by the corresponding decision engine may include automatic decisions being made with respect to any of the stages or steps associated with completing the financing agreement, and may further defer to human judgment or approval in making other determinations. In some embodiments, the decision engine may make recommendations regarding eligibility and/or terms that are then sent to an agent of the financing entity for further approval, such as when assisting with the underwriting stage of the financing process. In other embodiments, the decision engine may be configured to automatically make such determinations when certain conditions are met, such as when the amount of the loan is below a threshold value or the risk associated with lending to the user 110 is determined to be especially low based on the given circumstances. It is understood that the loan processes described herein preferably include some form of integration of the real-time decision making process to facilitate the advantages offered by the established relationship between the user 110 and the enterprise system 200 regarding the ability to collect relevant data regarding the user 110 for making an informed determination regarding the eligibility status and/or terms to be offered to the user 110, although human initiated or approved steps or processes may also be utilized during such a process while remaining within the scope of the present invention.

According to a final example, the enterprise system 200 may intervene to directly facilitate the transfer of funds between the user 110 and the seller of the product associated with the interactive element 402. In some circumstances, such an intervention may include the enterprise system 200 intervening to pre-populate certain fields associated with the transfer of funds via a payment system not associated with the enterprise system 200. Such pre-populating may include the entry of information relating to payment or shipping information. In other circumstances, the enterprise system 200 may directly facilitate the transfer of funds from an account of the user 110 to an external account via appropriate transfer methods accessible via the features of the application 132 and the capabilities of the enterprise system 200.

Referring now to FIG. 5, a summary of the method according to the present invention is shown in flow chart format. The method 1000 includes a step 1001 of the user 110 accessing and navigating a three-dimensional environment corresponding to a marketplace as described herein. The method then includes a step 1002 of the user 110 interacting with a selected interactive element 402 in a manner facilitating the completion of a transaction regarding the product and/or service associated with the interactive element 402, which typically refers to the user 110 purchasing the product and/or service in question. Regardless of the arrangement of the three-dimensional marketplace 401 relative to the enterprise system 200, the method includes a step 1003 of the enterprise system 200 receiving data indicative of the user 110 prospectively making a purchase of one or more products and/or services associated with one or more interactive elements 402 associated with the three-dimensional marketplace 401 via a corresponding interaction of the user 110 with one or more of the interactive elements 402. The receiving of such data may include the enterprise system 200 receiving any data necessary for providing a suitable communication in response, including information such as the price or classification of the product and/or service to be purchased.

Next, the enterprise system 200, via the computing system 206 thereof, executes a step 1004 where the enterprise system 200 analyzes the received interaction data with further reference to the known personal data set of the user 110. Specifically, the enterprise system 200 may execute an algorithm wherein at least one datum of the received interaction related data and at least one datum of the known personal data set of the user 110 are each utilized as an input in making a determination. Such analysis may refer to the determination of whether or not to send a communication at all or may refer to a determination of which type of communication to send and what content to include in said communication, as the circumstances may warrant. A step 1005 includes the enterprise system 200 sending a communication to the user 110 regarding potential financial services that can be offered by the enterprise system 200 to the user 110. The sending of the communication occurs following the initial interaction of the user 110 with the corresponding interactive element 402 and prior to the completion of the initiated transaction. Finally, the method optionally includes a step 1006 where the enterprise system 200 takes further action regarding the financial services offered or suggested within the corresponding communication of step 1005. For example, the user 110 may continue to communicate with an automated system or a representative agent 210 of the enterprise system 200 following a selection of the user 110 to pursue financing for completing the purchase in question. As another example, the enterprise system 200 may directly facilitate a monetary transfer for completing the terms of the transaction.

The describe method provides numerous advantages in comparison to traditional shopping methods. The ability of the enterprise system 200 to interact with the user 110 at desired instances in reaction to an indication that the user 110 may be researching a purchase or about to complete a purchase provides a real-time method of intervention during a shopping experience. That is, the enterprise system 200 can actively provide financial advice and/or financial services to the user 110 at the instant such interventions become relevant, such as during the browsing of products within such a three-dimensional marketplace. Such an ability to intervene immediately during a browsing or shopping session dramatically alters the shopping experience for the user 110 in comparison to a traditional shopping experience. For example, the user 110 can achieve financing via a partially or fully automated system, or may be able to bypass the entry of certain personal data, thereby greatly improving the efficiency of such a process. This may be in contrast to a traditional in-person shopping experience, wherein the financing of purchases may not be typical, or may require an extended period of time with an in-store agent of the marketplace to establish the terms and conditions of the financing. As another example, the user 110 can be advised on the determination of whether or not to make a certain purchase in real-time based on the analysis possible via the intervention of the enterprise system 200, thereby aiding the enterprise system 200 in directly addressing the needs of the individual user 110. As a final example, any processes associated with the enterprise system 200 taking further action, such as completing the process of establishing a loan, may be able to take place while the user 110 continues to navigate the three-dimensional marketplace, or even perform other unrelated tasks. That is, the described processes can be carried out contemporaneously to any other process available via use of the system 274, thereby allowing the user 110 to multi-task while receiving financial services that would otherwise require the full presence and attention of the user 110 in a real-world environment.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for monitoring and intervening with respect to prospective transactions occurring during navigation by a user of a virtual three-dimensional environment using a virtual reality computing device, the system managed by a first financial institution, the system comprising:

at least one processor;

a communication interface communicatively coupled to the at least one processor; and a memory device storing executable code that, when executed, causes the processor to:

monitor data transferred to or from the virtual reality computing device regarding activities of the user during navigation of the virtual three-dimensional environment, wherein the monitoring of data is performed by a first application executed by the virtual reality computing device and managed by the first financial institution, wherein the virtual three-dimensional environment is generated by a second application executed by the virtual reality computing device and managed by an independent entity different from the first financial institution, wherein the data transferred to or from the virtual reality computing device includes data exchanged between the virtual reality computing device and an external system associated with the independent entity, and wherein the first application is configured to monitor the data exchanged between the virtual reality computing device and the external system so as to identify the data relating to the activities of the user during navigation of the virtual three-dimensional environment, wherein the monitoring of the data includes monitoring data relating to one or more of a viewing perspective provided to the user by the second application via a headset of the virtual reality computing device, inputs initiated by the user with respect to the second application and via use of the headset or a controller of the virtual reality computing device, or a position of an avatar of the user within the virtual three-dimensional environment generated by the second application;

receive interaction data, sent via a function of the first application, when the monitoring of the data regarding the activities of the user during navigation of the virtual three-dimensional environment indicates that the user is interacting with an interactive element associated with a product and/or service in a manner indicative of the user prospectively purchasing the product and/or service during the navigation of the virtual three-dimensional environment, wherein the interaction data includes data regarding a price to purchase the product and/or service, and wherein the user interacting with the interactive element includes one or more of the avatar of the user having a position within the virtual three-dimensional environment that is within a predetermined distance of a position of the interactive element within the virtual three-dimensional environment, the interactive element being placed within the viewing perspective of the user via user-initiated movement of the headset, the avatar of the user manipulating the interactive element within the virtual three-dimensional environment, or the user providing an input via one or both of the headset or the controller indicating selection of the interactive element within the virtual three-dimensional environment;

access personal data of the user stored to the memory device, wherein the user has an existing financial account with the first financial institution, wherein the personal data of the user includes data associated with the existing financial account including one or more of a monetary account balance of the existing account, a credit rating of the user, or a predefined budget constraint of the user;

automatically determine in real-time, via use of a first algorithm, whether to initiate a modification of a current rendered state of the virtual three-dimensional environment, wherein the first algorithm includes the use of first inputs derived from each of the received interaction data and the accessed personal data, wherein the modification of the current rendered state of the virtual three-dimensional environment is initiated only when at least one circumstance indicative of potential financial detriment to the user is determined according to the first algorithm, the at least one circumstance including one or more of: the price of the prospective purchase being comparatively high relative to a monetary balance of the existing account or the price of the prospective purchase violating the predefined budget constraint of the user, and wherein initiation of the modification of the current rendered state further causes generation of environment-control data defining parameters for altering the current rendered state of the virtual three-dimensional environment;

automatically cause, in response to determining that the modification of the current rendered state of the virtual three-dimensional environment is to be initiated, the first application to transmit an environment-modification instruction to the second application executed by the virtual reality computing device, wherein the environment-modification instruction includes the environment-control data and is transmitted from the first application executing in a first execution context to the second application executing in a separate execution context, the environment-modification instruction corresponding to generation and spatial insertion of a three-dimensional object or avatar within the virtual three-dimensional environment based on the received interaction data and the accessed personal data, wherein, in reaction to receiving the environment-modification instruction, the second application modifies rendering data used to render the virtual three-dimensional environment, updates data representing objects within a three-dimensional coordinate space of the virtual three-dimensional environment to incorporate the three-dimensional object or avatar, and positions the three-dimensional object or avatar within the three-dimensional coordinate space relative to a current viewing perspective of the user as defined by headset movement data to visually display the three-dimensional object or avatar as a new virtual object within the three-dimensional environment that is viewable via the viewing perspective of the user provided by the headset;

automatically generate the three-dimensional object or avatar within the virtual three-dimensional environment generated by the second application in real time and in reaction to the modification of the rendering data, wherein the three-dimensional object or avatar is initially viewable within the viewing perspective of the user provided by the headset during the navigation of the three-dimensional environment at an instance prior to completion of the prospective purchase of the product and/or service by the user to allow for intervention prior to the user completing a transaction deemed indicative of potential financial detriment to the user as determined according to the first algorithm, wherein the three-dimensional object or avatar is configured to receive and respond to user input events generated via operation of one or more of the headset and/or the one or more controllers during navigation of the virtual three-dimensional environment and via use of the second application.

2. The system of claim 1, wherein the virtual three-dimensional environment is a three-dimensional marketplace.

3. The system of claim 2, wherein the three-dimensional marketplace mimics an appearance of an actual real-world marketplace.

4. The system of claim 1, wherein the interactive element is a three-dimensional representation of the product and/or service or a packaging of the product and/or service.

5. The system of claim 1, wherein the first algorithm includes a determination made by a comparison of the monetary account balance of the existing account to the price to purchase the product and/or service.

6. The system of claim 1, wherein the accessed personal data of the user includes an account setting or a selection of the user regarding conditions under which to initiate the modification of the current rendered state of the virtual three-dimensional environment regarding the prospective purchase of the product and/or service.

7. The system of claim 1, wherein the generated three-dimensional object or avatar is configured to provide financial advice to the user regarding the prospective purchase of the product and/or service in reaction to receiving a user input event, wherein the financial advice provided to the user regarding the prospective purchase of the product and/or service includes a recommendation regarding one or more of: whether the prospective purchase is within the predetermined budget constraint of the user, whether the prospective purchase can be afforded according to a balance of the monetary account balance of the existing account of the user with the financial institution, which form of payment available to the user should be utilized for maximizing rewards or points associated with completing the prospective purchase, whether an offer of a loan or line of credit should be accepted by the user to complete the transaction, or budgeting tips for covering the expense associated with the prospective purchase.

8. The system of claim 7, wherein the loan or the line of credit is offered to the user by the first financial institution.

9. The system of claim 7, wherein the financial advice to the user regarding the prospective purchase of the product and/or service associated with the interactive element is provided by the first financial institution.

10. A method for monitoring and intervening with respect to prospective transactions occurring during navigation by a user of a virtual three-dimensional environment using a virtual reality computing device, the method comprising:

monitoring data transferred to or from the virtual reality computing device regarding activities of the user during navigation of the virtual three-dimensional environment, wherein the monitoring of data is performed by a first application executed by the virtual reality computing device and managed by a first financial institution, wherein the virtual three-dimensional environment is generated by a second application executed by the virtual reality computing device and managed by an independent entity different from the first financial institution, wherein the data transferred to or from the virtual reality computing device includes data exchanged between the virtual reality computing device and an external system associated with the independent entity, and wherein the first application is configured to monitor the data exchanged between the virtual reality computing device and the external system so as to identify the data relating to the activities of the user during navigation of the virtual three-dimensional environment, wherein the monitoring of the data includes monitoring data relating to one or more of a viewing perspective provided to the user by the second application via a headset of the virtual reality computing device, inputs initiated by the user with respect to the second application and via use of the headset or a controller of the virtual reality computing device, or a position of an avatar of the user within the virtual three-dimensional environment generated by the second application;

receiving interaction data by a computing system of the first financial institution when the monitoring of the data regarding the activities of the user during navigation of the virtual three-dimensional environment indicates that the user is interacting with an interactive element associated with a product and/or service in a manner indicative of the user prospectively purchasing the product and/or service during the navigation of the virtual three-dimensional environment, wherein the interaction data includes data regarding a price to purchase the product and/or service, wherein the interaction data is sent as a function of the first application, and wherein the user interacting with the interactive element includes one or more of the avatar of the user having a position within the virtual three-dimensional environment that is within a predetermined distance of a position of the interactive element within the virtual three-dimensional environment, the interactive element being placed within the viewing perspective of the user via user-initiated movement of the headset, the avatar of the user manipulating the interactive element within the virtual three-dimensional environment, or the user providing an input via one or both of the headset or the controller indicating selection of the interactive element within the virtual three-dimensional environment;

accessing personal data of the user by the computing system of the first financial institution, wherein the user has an existing financial account with the first financial institution, and wherein the personal data of the user includes data associated with the existing financial account including one or more of a monetary account balance of the existing account, a credit rating of the user, or a predefined budget constraint of the user; and automatically determining in real-time by the computing system of the first financial institution, via use of a first algorithm, whether to initiate a modification of a current rendered state of the virtual three-dimensional environment, wherein the first algorithm includes the use of first inputs derived from each of the received interaction data and the accessed personal data, wherein the modification of the current rendered state of the virtual three-dimensional environment is initiated only when at least one circumstance indicative of potential financial detriment to the user is determined according to the first algorithm, the at least one circumstance including one or more of: the price of the prospective purchase being comparatively high relative to a monetary balance of the existing account or the price of the prospective purchase violating the predefined budget constraint of the user, and wherein initiation of the modification of the current rendered state further causes generation of environment-control data defining parameters for altering the current rendered state of the virtual three-dimensional environment;

automatically causing, in response to determining that the modification of the current rendered state of the virtual three-dimensional environment is to be initiated, the first application to transmit an environment-modification instruction to the second application executed by the virtual reality computing device, wherein the environment-modification instruction includes the environment-control data and is transmitted from the first application executing in a first execution context to the second application executing in a separate execution context, the environment-modification instruction corresponding to generation and spatial insertion of a three-dimensional object or avatar within the virtual three-dimensional environment based on the received interaction data and the accessed personal data, wherein, in reaction to receiving the environment-modification instruction, the second application modifies rendering data used to render the virtual three-dimensional environment, updates data representing objects within a three-dimensional coordinate space of the virtual three-dimensional environment to incorporate the three-dimensional object or avatar, and positions the three-dimensional object or avatar within the three-dimensional coordinate space relative to a current viewing perspective of the user as defined by headset movement data to visually display the three-dimensional object or avatar as a new virtual object within the three-dimensional environment that is viewable via the viewing perspective of the user provided by the headset;

automatically generating the three-dimensional object or avatar within the virtual three-dimensional environment generated by the second application in real time and in reaction to the modification of the rendering data, wherein the three-dimensional object or avatar is initially viewable within the viewing perspective of the user provided by the headset during the navigation of the three-dimensional environment at an instance prior to completion of the prospective purchase of the product and/or service by the user to allow for intervention prior to the user completing a transaction deemed indicative of potential financial detriment to the user as determined according to the first algorithm, wherein the three-dimensional object or avatar is configured to receive and respond to user input events generated via operation of one or more of the headset and/or the one or more controllers during navigation of the virtual three-dimensional environment and via use of the second application.

\* \* \* \* \*